United States Patent [19]

Vanderhye

[11] 4,164,201
[45] Aug. 14, 1979

[54] GROUND-SUPPORTED POULTRY DRINKING FOUNTAIN

[75] Inventor: Robert A. Vanderhye, Springfield, Va.

[73] Assignee: Interfarm Corporation, McLean, Va.

[21] Appl. No.: 843,055

[22] Filed: Oct. 17, 1977

[51] Int. Cl.² .................... A01K 39/02; A01K 7/02
[52] U.S. Cl. ................................................ 119/81
[58] Field of Search ........................ 119/81; 137/408

[56] References Cited

U.S. PATENT DOCUMENTS

| | | | |
|---|---|---|---|
| 1,033,308 | 7/1912 | Fish | 119/81 |
| 2,632,463 | 3/1953 | Martin | 119/81 X |
| 2,669,220 | 2/1954 | Goff | 119/81 |
| 3,283,746 | 11/1966 | Ruter | 119/81 |
| 3,590,782 | 7/1971 | Kantor | 119/81 |
| 3,685,495 | 8/1972 | Kantor | 119/81 |

*Primary Examiner*—Hugh R. Chamblee
*Attorney, Agent, or Firm*—Cushman, Darby & Cushman

[57] ABSTRACT

A ground-supported poultry drinking fountain utilizing a bell-shaped member having an annular trough. A massive ground support member is disposed within the interior of the bell-shaped member, and connecting rods extend through the bell-shaped member to rigidly connect the massive support member to a valve-supporting member. Adjustments are provided for adjusting the effective length of the rod and therefore the height of the trough off the ground. A valve for supplying water to the trough is supported by the valve support member, and a spring is provided to suspend the bell-shaped member from the valve support member independent of the connecting rods so that the annular trough will reciprocate vertically under the influence of the spring depending upon the amount of water in the trough. Force-concentrating surface manifestations and/or an extremely massive bottom can be provided with the support member to ensure that the fountain stays immobile with respect to the ground.

7 Claims, 5 Drawing Figures

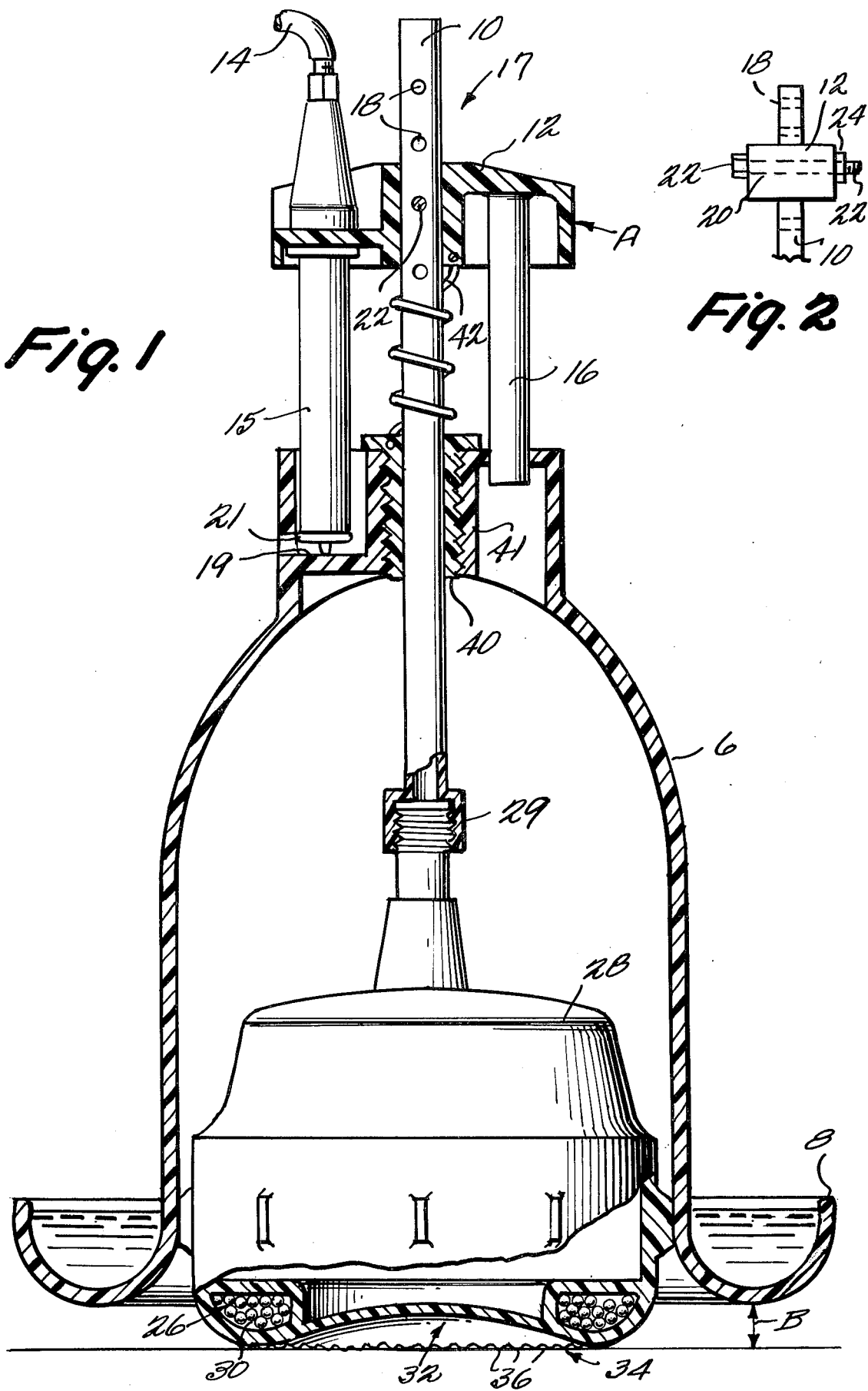

GROUND-SUPPORTED POULTRY DRINKING FOUNTAIN

BACKGROUND AND SUMMARY OF THE INVENTION

There are two basic types of poultry drinking fountains: ground supported fountains and suspension-type fountains. Typical ground support fountains, such as shown in U.S. Pat. Nos. 1,033,308 and 2,669,220 have supporting arrangements that restrict access to the water in the fountain, have drinking bowls that have a large volume of water compared to the access area thereof, and do not lend themselves to easy adjustability. The capability of a drinker to adjust depending upon the size of the poultry that will be drinking from the fountain is important since if the drinker is too high off the ground, the animals will not be able to readily drink therefrom, and if it is too close to the ground the poultry will have to spend too long a period of time at the fountain per volume of water consumed because their inherent drinking technique is inefficient when they must bend over too far.

Conventional suspension-type drinkers—such as shown in U.S. Pat. Nos. 3,283,746 and 3,685,495,—provide the necessary adjustability depending upon the poultry size by untying the hanger strap, pulling the drinker upwardly, and retying the strap, and also provide a large drinking area for a given volume of water within the drinking trough. However, such suspension-type drinkers are not as readily movable and placeable within a poultry-raising area as ground supported fountains since they require a support member that is accessibly located directly vertically above the position in which they are to be disposed. Additionally, the adjustment mechanism can be cumbersome and time consuming depending upon how high the vertical support for the drinker is located above the ground.

According to the present invention, a ground-supported poultry drinking fountain is provided that has the readily locatable, high access, and adjustability characteristics of suspension-type drinkers and the readily locatable advantages of ground supported drinkers, without the drawbacks of either conventional ground supported drinkers or suspension-type drinkers. According to the present invention, a poultry drinking fountain is provided that comprises a generally bell-shaped member with a generally annular trough portion at the lower end thereof and a hollow interior. A ground-engaging support member having sufficient mass to support the trough without tip-over is disposed within the hollow interior of the bell-shaped member. A valve support member mounts a valve for supplying water from a source to the trough portion of the bell-shaped member, and connection means are provided extending from the support member through the bell-shaped member to the valve support member for rigidly attaching the support member to the valve support member. The connecting means include adjustment means for providing adjustment of the vertical spacing of the valve support member, and thus a generally annular trough from the bottom of the support member. Spring means are provided for suspending the bell-shaped member from the valve support member independent of the connection means so that the annular trough will reciprocate vertically under the influence of the spring means with varying amounts of water disposed in the trough.

The connection means according to the invention may take a variety of forms. For instance, a single rod concentric with the support member and the bell-shaped member may be provided, the rod having a plurality of openings formed therein at vertically spaced points therealong. These openings cooperate with an opening forming the valve support member, and releasable means—such as nut and bolt connections—pass through the valve support member opening and one of the openings in the rod for affixing the valve support member and the rod together. Alternatively, a plurality of rods may be provided with the valve member disposed centrally of the rods, and adjustment is provided by a number of openings in each of the rod members cooperating with abutment means formed on the valve support member for receipt of bolts or the like passing through the rods' openings. Three rod members normally are provided where the valve member is concentric with the bell-shaped member and the support member.

The support member preferably comprises a hollow container adapted to be filled with water or other fluent material. A releasable connector is provided at the top of the support member for connecting the support member to the connection means, while allowing access to the interior of the support member so that it can be filled with water or like fluent material. The support member may further comprise an annular bottom portion of material that is extremely massive—such as lead shot—and the ring of massive material may be disposed directly over a ring of serrations or like force-concentrating means formed on the bottom of the support member, so that the weight of the fountain is generally transferred to a relatively small area of the ground engaged by the support member to maximize immobility of the support member with respect to the ground.

It is the primary object of the present invention to provide a poultry drinking fountain having the majority of the advantages of both conventional ground supported and suspension-type of poultry drinking fountains. This and other objects of the invention will become clear from an inspection of the detailed description of the invention and from the appended claims.

BRIEF DESCRIPTION OF THE DRAWINGS

FIG. 1 is a longitudinal sectional view, with some parts in elevation, of an exemplary drinking fountain according to the invention;

FIG. 2 is a detail view of the connection between the supporting rod and valve support member of the drinker of FIG. 1 looking along arrow A of FIG. 1, and with the guide member removed for clarity;

DETAILED DESCRIPTION OF THE INVENTION

Figure 3:
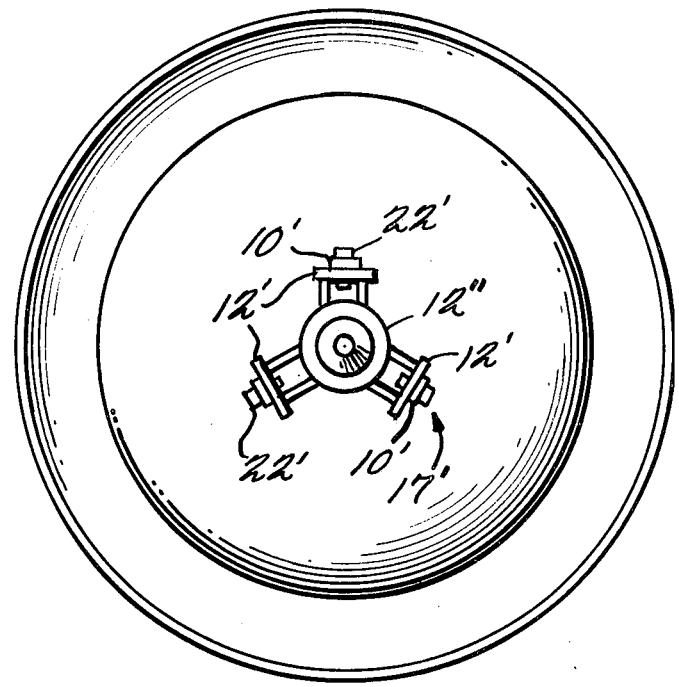
FIG. 3 is a longitudinal sectional view, with some parts in elevation, of a modified form of the fountain according to the invention.

The poultry drinking fountain illustrated in the drawings comprises a generally bell-shaped member 6 with a hollow interior, and a generally annular trough portion 8 formed at the lower end of the member 6. The trough 8 provides a large accessible drinking area relative to the volume of water contained therein. A ground-engaging support member 28 having sufficient mass to support the bell-shaped member 6 in an upright position so that poultry may drink out of the trough portion without tip-over is disposed within the hollow interior of the member 6. The support member 28 is generally the same diameter as the bell-shaped member 6 interior. A valve member 15 for supplying water from a source to the trough portion 8 is normally spring biased into a closed flow-preventing position, but movable against the spring bias into an open flow-allowing position. A valve support member 12 mounts the valve 15 in a generally vertically-extending position.

Connection means, 10, 10', extend from the support member 28 through the bell-shaped member 6 to the valve support 12 for rigidly attaching the valve support member 12 to the support member 28. The connecting means include adjustment means 17 for providing adjustment of the vertical spacing of the valve support member 12, and thus the trough 8 from the bottom of the support member 28. An abutment surface 19 is formed on the bell-shaped member for engaging the valve member 15 to move it against its spring bias from the closed to the open position. Spring means 42, 42' suspend the bell-shaped member 6 from the valve support member 12 independent of the connection means 10, 10' so that the trough will reciprocate vertically under the influence of the spring means 42 with varying amounts of water disposed in the trough, causing the valve member to open to allow flow of water into the trough when the amount of water in the trough is small enough so that the abutment member 19 moves under the influence of the spring means 42 into operative contact with the valve member 15.

The valve 15 may be of a conventional type, such as shown in U.S. Pat. Nos. 3,283,746 or 3,685,495, and water is supplied thereto through a hose 14 from a source. For the embodiment shown in FIG. 1, a guide member 16 is provided, both the valve 15 and guide rod 16 being radially displaced from a single central rod 10 forming the connection means, with the membrs 15, 16 disposed on opposite sides of the rod 10. With the construction of FIG. 1, by lifting up on the member 12 and pulling against the bias of the tension spring 42, until the valve 15 and guide member 16 clear interfering portions of the bell-shaped member 6, one can rotate the valve support 12 with respect to the bell-shaped member 6 so that the valve 15 is exposed. In the exposed position, it may readily be cleaned or replaced.

In the FIGS. 1 and 2 embodiments, the adjustment means 17 is provided by a plurality of openings 18 formed along the length of the central rod 10, and an opening 20 is formed in the valve member 12 for cooperation with the openings 18, one-at-a-time. Releasable means, such as a bolt 22, passes through the opening 20 and one of the openings 18, and is held in releasable engagement by a nut 24 or the like. In order to adjust the spacing B of the trough 8 from the ground depending upon the size of the chicken using the fountain, it is only necessary to remove the bolt 22, slide the valve support member 12 along the rod 10 until the trough 8 is at the desired height, and then pass the bolt 22 through the opening 20 and the corresponding new opening 18, and refix the bolt 22 in that position with a nut 24.

To adjust the sensitivity of the bell-shaped member 6 to the amount of water disposed in the trough 8—to provide for different levels of water in the trough 8—screw-threaded adjustment means 40, 41 are provided. By rotation of the member 40 with respect to the member 41, the elongation of the spring means 42 is changed, and thus the level of the water in the trough 8 which will cause the abutment means 19 to move into engagement with the valve member 15 and cause the flow of water from hose 14, through member 15 and opening 21, down the outer surface of the bell-shaped member 6, to the trough 8.

Figure 4:
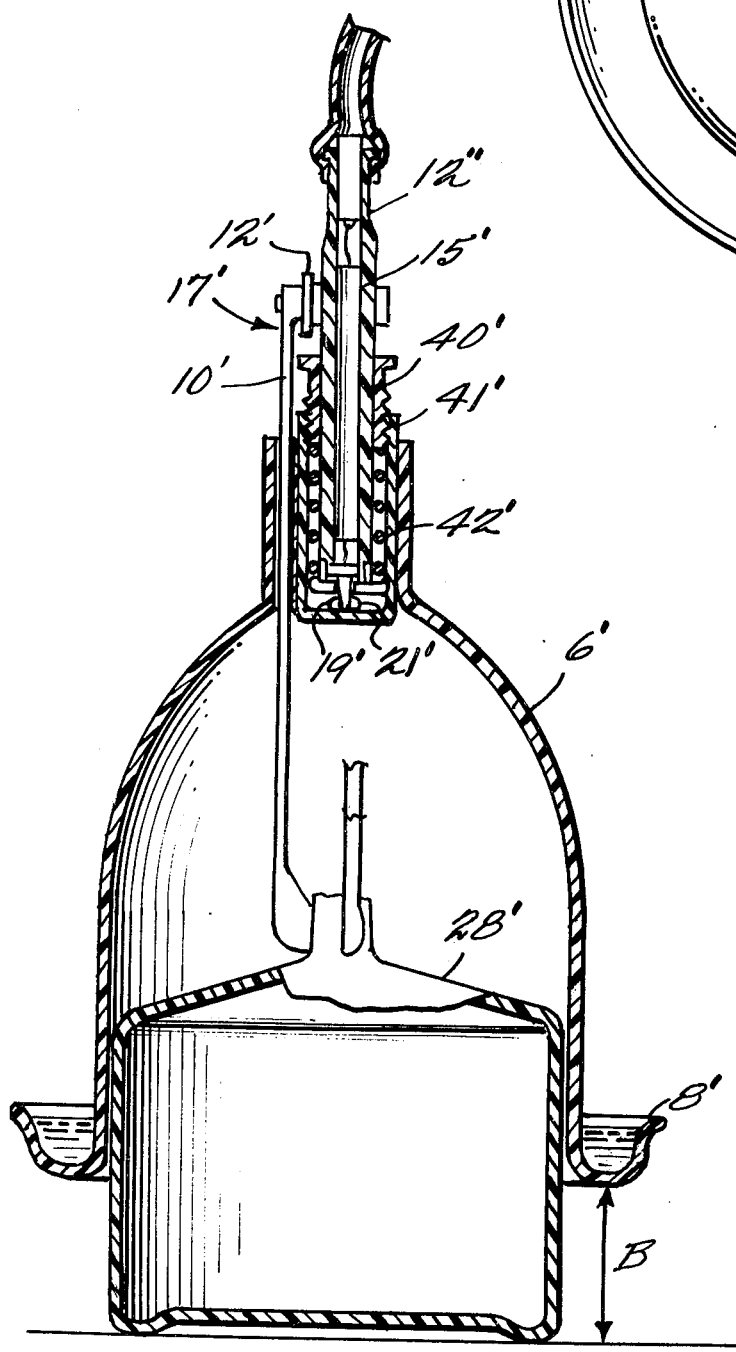
FIG. 4 is a top plan, schematic, view of the drinker of FIG. 3 showing the connection between the support rods and the valve support member in detail.
Figure 5:
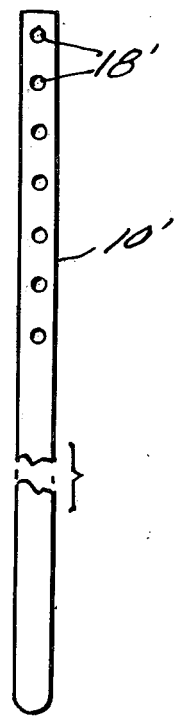
FIG. 5 is a front view of an exemplary rod of the fountain of FIG. 3.

A modification of a fountain according to the present invention is illustrated in FIGS. 3-5. The fountain in FIG. 3 is shown in the adjusted position wherein the trough 8' is spaced the maximum distance B from the ground (whereas in the modification of FIG. 1 the trough 8 was shown spaced only a small distance B from the ground). Preferably, the distance B in FIG. 3 should be about 8 to 12 inches.

In the FIG. 3 embodiment, the connection means comprises a plurality of rods 10' each extending from the support member 28' to the valve support member 12''. The adjustment means 17 are provided by a plurality of openings 18' formed along the length of each of the rods 10', and cooperating abutment surfaces 12'' formed on the valve support member 12, each of the abutments 12' having an opening formed therein for receipt of a releasable connector—such as a bolt 22'—or the like. The openings in the abutments 12' may be threaded to receive the threads of a bolt 22' therein. For the FIG. 3 embodiment, the valve 15 is located centrally of the rods 10', and preferably three rods 10' are provided in order to ensure secure positioning of the bell-shaped member 6 in place.

While the adjustment means 17, 17' in the drawings have been shown as a plurality of openings with cooperating detachable bolts or the like, it is to be understood that a wide variety of conventional different forms of connectors are within the scope of the invention. For instance, integral resilient pips may be formed on the rods 10' for releasably engaging the surface manifestation of an opening or the like formed in an abutment member 12', or no openings need be provided at all but rather detachable clamps may be used to hold the members 10–10', 12, 12'' together. Also, the valve member 12—or the abutment means 12' associated therewith—may have a plurality of openings formed therein in addition to, or instead of, the plurality of openings in the rods 10, 10' to provide for the different adjustment heights.

The support member 28, 28' preferably comprises a hollow container that is adapted to be filled with water or the like. A releasable connection 29 may be provided between the support member 28 and the connection means 10, 10' in order to allow access to the interior of the support member 28 so that it may be filled with water or like fluent material. If the mass of the fluent material-filled support member 28 is not sufficient to ensure that the fountain cannot be moved around or tipped over by the poultry, various ballast and force-concentrating means may be provided. For instance, an annular ring 26 may be provided in the bottom of the support member 28 (or 28'), the ring 26 being filled (either by the ultimate consumer, or at the factory) with very dense, massive material, such as lead pellets 30. Also, force-concentrating means may be formed on the bottom of the member 28 for transferring to a relatively small area of the ground engaged by the support member 28 the weight of the entire drinker in order to maximize the immobility of the support member 28. Such force-concentrating means may include an elevated middle portion 32 of the support member 28, with only the ring 34 at the bottom of the member 28 engaging the ground. In addition, the ring 34 could be serrated—having teeth 36—formed with spikes, or the like. With both the annular portion 26 and the annular ring 34, an extremely stable structure is provided since a large mass is concentrated over a relatively small area, yet the area has a broad enough base to prevent tip-over.

In using the drinker according to the present invention, it is not necessary to place the fountain only under accessible vertical supports, yet the fountain has all of the advantageous adjustable features of suspension-type drinkers and provides a large access area for drinking relative to the amount of water contained in the trough. In use, one simply hooks the hose 14 up to the valve member 15, and places the support member 28 at any desired position on the ground. The height B of the trough 8, 8' off of the ground is adjusted by removing the releasable connector(s) 22, 22' and moving the proper opening 18, 18' into registery with the corresponding opening (20) associated with the valve support member 12 (or abutment means 12'), and the releasable connector 22, 22' is re-inserted. The level of water to be provided in the trough 8, 8' is then adjusted by rotation of the screw-threaded member 40, 40' with respect to the threaded collar 41, 41', thereby increasing or decreasing the tension of the spring means 42, 42'. As the level of water in the trough 8, 8' decreases due to chickens drinking out of the trough 8, 8', the abutment means 19, 19' will then move under the influence of spring means 42, 42' vertically upwardly to actuate the valve 15, 15' and allow a flow of water from the hose 14 through the valve member 15, 15' and through the opening(s) 21, down the surface of the bell-shaped member 6, and into the trough 8, 8', therefore causing the trough 8, 8' to move downwardly against the bias of spring means 42, 42' so that the abutment means 19, 19' moves out of operative engagement with the valve member 15, 15'.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A poultry drinking fountain comprising:
    a generally bell-shaped member with a generally annular trough portion at the lower end thereof, and a hollow interior,
    a ground-engaging support member adapted to have sufficient mass to support said bell-shaped member in an upright position so that poultry may drink out of said trough portion without tip-over, said support member disposed within the hollow interior of said bell-shaped member, and having generally the same diameter as said bell-shaped member interior,
    a valve member for supplying water from a source to said trough portion, said valve member normally spring-biased into a closed flow-preventing position, but movable against the spring bias into an open flow-allowing position,
    a valve support member for said valve for mounting said valve member in a generally vertically-extending position,
    connection means extending from said support member through said bell-shaped member to said valve support member for rigidly attaching said support member to said valve support member, said connecting means including adjustment means for providing adjustment of the vertical spacing of said valve support member, and thus said generally annular trough, from the bottom of said support member, so that the fountain is adjustable to provide said trough portion at the optimum height for poultry from birth to maturity,
    said connection means including a single rod concentric with said support member and said bell-shaped member; and said adjustment means comprising a plurality of openings formed at vertically spaced points along said rod, an opening formed in said valve support member adapted to cooperate with said openings in said rod, one-at-a-time, and releasable means passing through said valve support member opening and one of said openings in said rod for affixing said valve support member and said rod together,
    an abutment surface on said bell-shaped member for operatively engaging said valve member to move it against its spring-bias from the closed to the open position, and
    spring means for suspending said bell-shaped member from said valve support member independent of said connection means so that said annular trough will reciprocate vertically under the influence of said spring means with varying amounts of water disposed in said trough, causing said valve member to open to allow flow of water into said trough when the amount of water in said trough is small enough so that said abutment member moves under the influence of said spring means into operative contact with said valve member.

2. A poultry drinking fountain as recited in claim 1 wherein said valve member is supported by said valve support member radially displaced from said rod, and wherein a guide rod is provided parallel to said rod and said valve member radially spaced from said rod opposite said valve member, and wherein said valve member is rotatable with respect to said bell-shaped member upon lifting of said valve member against the bias of said spring means to a position whereat said valve member and said guide member clear interfering surfaces on said bell-shaped member, to allow ready access to and replacement of said valve member.

3. A poultry drinking fountain as recited in claim 1 wherein said support member comprises a hollow container adapted to be filled with water or other fluent material.

4. A poultry drinking fountain as recited in claim 3 further comprising a releasable connector for connecting said support member to said connection means.

5. A poultry drinking fountain as recited in claim 3 wherein said support member further comprises an annular bottom portion thereof of material that is massive relative to the mass of the fluent material filling the hollow container.

6. A poultry drinking fountain as recited in claim 3 further comprising force-concentrating means formed on the bottom of said support member so that the weight of said fountain in general is transferred to a relatively small area of the ground engaged by said support member to maximize the immobility of said support member with respect to the ground.

7. A poultry drinking fountain comprising:
- a generally bell-shaped member with a generally annular trough portion at the lower end thereof, and a hollow interior;
- a ground-engaging support member adapted to have sufficient mass to support said bell-shaped member in an upright position so that poultry may drink out of said trough portion without tip-over, said support member disposed within the hollow interior of said bell-shaped member;
- a valve member for supplying water from a source to said trough portion, said valve member movable between open and closed positions;
- a valve support member for said valve for mounting said valve member;
- connection means extending from said support member through said bell-shaped member to said valve support member for rigidly attaching said support member to said valve support member and including a single rod concentric with said support member and said bell-shaped member and said connecting means further including adjustment means for providing adjustment of the vertical spacing of said valve support member, and thus said generally annular trough, from the bottom of said support member;
- means associated with said bell-shaped member for operatively engaging said valve member to move it from one position to another;
- spring means for suspending said bell-shaped member from said valve support member independent of said connection means so that said annular trough will reciprocate vertically under the influence of said spring means with varying amounts of water disposed in said trough, causing said valve member to open to allow flow of water into said trough when the amount of water in said trough is below a predetermined level; and
- said valve member being supported by said valve support member radially displaced from said rod, and a guide rod being provided parallel to said rod and said valve member radially spaced from said rod opposite said valve member; said valve member being rotatable with respect to said bell-shaped member upon lifting of said valve member against the bias of said spring means to a position whereat said valve member and said guide member clear interfering surfaces on said bell-shaped member, to allow ready access to and replacement of said valve member.

* * * * *